US008100421B2

(12) United States Patent
Bennett

(10) Patent No.: US 8,100,421 B2
(45) Date of Patent: *Jan. 24, 2012

(54) VEHICLE HAVING MULTIPLE OPERATIONAL MODES

(76) Inventor: Michael Joseph Bennett, Roanoke, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/971,898

(22) Filed: Dec. 17, 2010

(65) Prior Publication Data

US 2011/0079975 A1 Apr. 7, 2011

Related U.S. Application Data

(63) Continuation of application No. 12/282,621, filed as application No. PCT/US2007/064634 on Mar. 22, 2007, now Pat. No. 7,862,055.

(60) Provisional application No. 60/785,515, filed on Mar. 25, 2006.

(51) Int. Cl.
*B62M 1/00* (2010.01)
*B62B 3/00* (2006.01)
*B62K 15/00* (2006.01)

(52) U.S. Cl. ............. 280/87.05; 280/87.03; 280/87.041; 280/47.11; 180/208; 180/210

(58) Field of Classification Search ............ 280/87.041, 280/87.01, 87.03, 87.042, 87.043, 87.05, 280/87.021, 47.11, 6, 2, 21.1; 180/208, 210
See application file for complete search history.

(56) References Cited

U.S. PATENT DOCUMENTS

| 1,267,050 A | | 5/1918 | Brigel | |
|---|---|---|---|---|
| 1,313,470 A | | 8/1919 | Discher | |
| 1,395,497 A | | 11/1921 | Huseman | |
| 1,416,864 A | | 5/1922 | Parkes | |
| 1,442,808 A | | 1/1923 | Huseman | |
| 1,516,105 A | | 11/1924 | Kinoshita | |
| 1,530,165 A | * | 3/1925 | Fowler | 280/87.042 |
| 1,663,121 A | * | 3/1928 | Dudek et al. | 280/87.021 |
| 1,890,755 A | | 4/1932 | Shepherd | |
| 2,200,935 A | * | 5/1940 | Rodriguez | 188/5 |
| 2,713,496 A | | 7/1955 | Ayers | |
| 2,792,874 A | | 5/1957 | Sundberg | |
| 4,043,566 A | * | 8/1977 | Johnson | 280/87.042 |
| 4,054,296 A | * | 10/1977 | Sullins | 280/11.211 |
| 4,145,065 A | * | 3/1979 | Kupka | 280/87.041 |
| 4,167,225 A | * | 9/1979 | Fragoso | 188/5 |
| 4,168,076 A | * | 9/1979 | Johnson | 280/11.216 |
| 4,944,360 A | | 7/1990 | Sturges | |
| 4,951,958 A | | 8/1990 | Chao | |

(Continued)

OTHER PUBLICATIONS

International Preliminary Report on Patentability from corresponding International Application PCT/US07/64634 issued by the International Preliminary Examining Authority on Mar. 18, 2011.

(Continued)

*Primary Examiner* — John R Olszewski
(74) *Attorney, Agent, or Firm* — James E. Walton; Richard G. Eldredge

(57) ABSTRACT

A vehicle includes a deck, an aft running gear attached to the deck, a steering assembly, a flexible joint attaching the steering assembly to the deck, such that the steering assembly is pivotable about the flexible joint with respect to the deck between a rider-standing mode and a rider-sitting mode, and a brake assembly attached to the deck.

12 Claims, 13 Drawing Sheets

U.S. PATENT DOCUMENTS

| | | | |
|---|---|---|---|
| 5,090,716 A * | 2/1992 | Borden | 280/87.042 |
| 5,183,129 A * | 2/1993 | Powell | 180/208 |
| 5,848,660 A | 12/1998 | McGreen | |
| 6,035,976 A * | 3/2000 | Duhamel | 188/5 |
| D456,047 S | 4/2002 | Mandic | |
| 6,367,828 B1 | 4/2002 | Mandic | |
| 6,378,880 B1 * | 4/2002 | Lin | 280/87.05 |
| 6,672,607 B2 * | 1/2004 | Chung | 280/246 |
| 6,889,784 B2 * | 5/2005 | Troll | 180/13 |
| 2002/0000702 A1 | 1/2002 | Charron | |
| 2002/0093161 A1 * | 7/2002 | Udwin et al. | 280/87.05 |
| 2003/0188906 A1 * | 10/2003 | Bank | 180/210 |
| 2004/0032105 A1 | 2/2004 | Tsai | |
| 2005/0057012 A1 * | 3/2005 | Boyle et al. | 280/87.05 |
| 2005/0212245 A1 | 9/2005 | Fernandez | |

OTHER PUBLICATIONS

Issue Notification dated Dec. 15, 2010 from corresponding U.S. Appl. No. 12/282,621.

Issue Fee Statement dated Nov. 24, 2010 from corresponding U.S. Appl. No. 12/282,621.

Notice of Allowability dated Aug. 23, 2010 from corresponding U.S. Appl. No. 12/282,621.

Amendment After Final dated Aug. 16, 2010 from corresponding U.S. Appl. No. 12/282,621.

Final Office Action dated Jun. 25, 2010 from corresponding U.S. Appl. No. 12/282,621.

Amendment dated Apr. 27, 2010 from corresponding U.S. Appl. No. 12/282,621.

Office Action dated Feb. 8, 2010 from corresponding U.S. Appl. No. 12/282,621.

Publication of Application dated Feb. 19, 2009 from corresponding U.S. Appl. No. 12/282,621.

371 Acceptance Letter dated Nov. 18, 2008 from corresponding U.S. Appl. No. 12/282,621.

Filing Receipt dated Nov. 13, 2008 from corresponding U.S. Appl. No. 12/282,621.

Article 34 Amendments dated Jan. 22, 2008 from corresponding International Application No. PCT/US2007/064634.

* cited by examiner

VEHICLE HAVING MULTIPLE OPERATIONAL MODES

This application is a continuation of U.S. application Ser. No. 12/282,621, filed 11 Sep. 2008, titled "Vehicle Having Multiple Operational Modes," which claims the benefit of International application No. PCT/US2007/064634, filed 22 Mar. 2007, titled "Vehicle Having Multiple Operational Modes," which claims the benefit of U.S. Provisional application No. 60/785,515, filed 25 Mar. 2006, titled "Vehicle Having Multiple Operational Modes," each of which are hereby incorporated by reference for all purposes as if fully set forth herein.

BACKGROUND

1. Field of the Invention

The present invention relates in general to the field of vehicles.

2. Description of Related Art

Many vehicles exist in the art. One type of conventional vehicle, commonly referred to as a wheeled scooter, generally includes a deck supported by a plurality of wheels that allow the vehicle to travel over a surface. Many such vehicles are configured either for a rider to sit on the vehicle or for a rider to stand on the vehicle. Other such vehicles can be converted between standing operation and sitting operation, but only through structural or other mechanical alterations. Braking systems of such convertible vehicles are generally well suited for either standing operation or sitting operation, but not both.

There are many vehicles well known in the art; however, considerable room for improvement remains.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
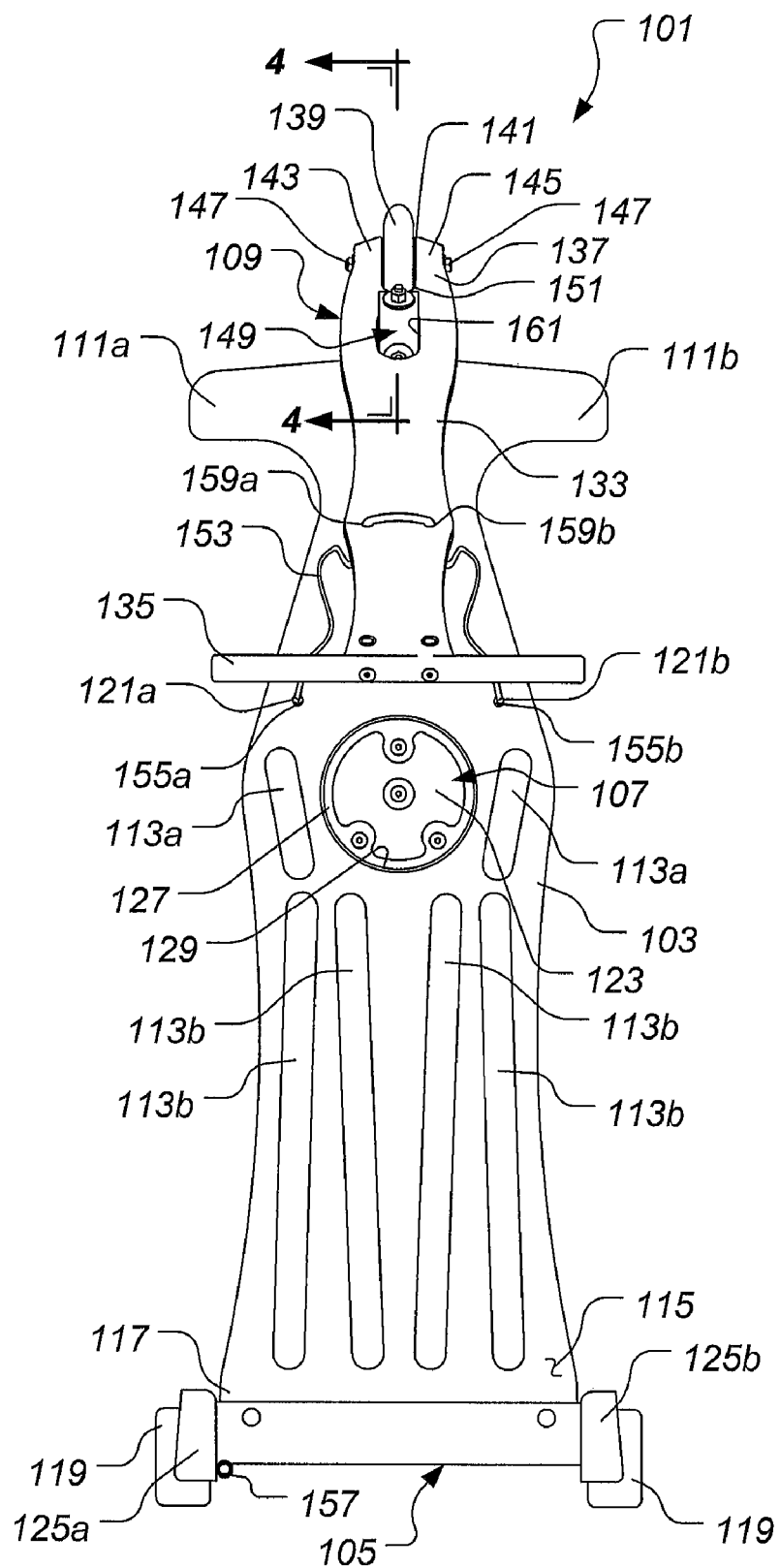
FIG. 1 is a top, plan view of an illustrative embodiment of a vehicle.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In one embodiment, a vehicle includes a deck, an aft running gear attached to the deck, a steering assembly, a flexible joint attaching the steering assembly to the deck, such that the steering assembly is pivotable about the flexible joint with respect to the deck between a rider-standing mode and a rider-sitting mode, and a brake assembly attached to the deck.

In another embodiment, a vehicle includes a deck defining an opening and a fulcrum, an aft running gear attached to the deck, and a steering arm having a handle at a first end and a yoke at a second end, the steering arm defining an opening therethrough. The vehicle further includes a wheel operably associated with the yoke of the steering arm and a flexible joint attaching the steering assembly to the deck. The flexible joint comprises a first flexible member attached at a first end to the steering arm and attached at a second end to a lower surface of the deck, the first flexible member extending through the opening of the steering arm; and a second flexible member attached at a first end to the steering arm and attached at a second end to an upper surface of the deck, the second flexible member extending through the opening of the steering arm and extending across the first flexible member, such that the steering arm pivots about the fulcrum of the deck. The vehicle further includes a brake pedal; a biasing element attached at a first end to the lower surface of the deck and at a second end to the brake pedal, such that the biasing element biases the brake pedal to be received in the opening defined by the deck; and a brake pad attached to the brake pedal.

A method includes providing a vehicle that includes a deck, an aft running gear attached to the deck, a steering assembly, a flexible joint attaching the steering assembly to the deck, and a brake assembly attached to the deck. The method further includes pivoting the steering assembly about the flexible joint with respect to the deck to place the vehicle in one of a rider-standing mode and a rider-sitting mode.

Figure 2:
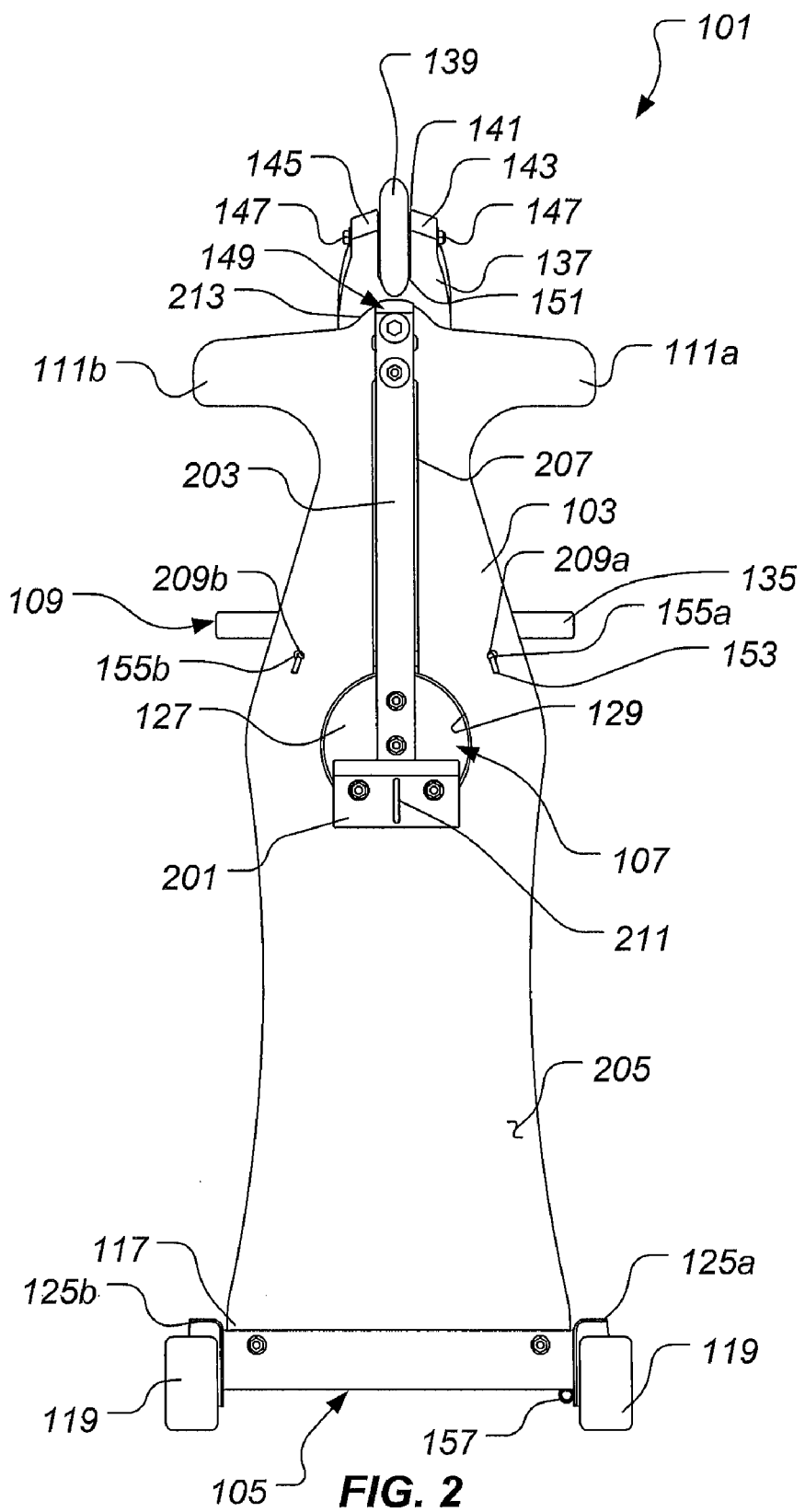
FIG. 2 is a bottom, plan view of the vehicle of FIG. 1.
Figure 3:
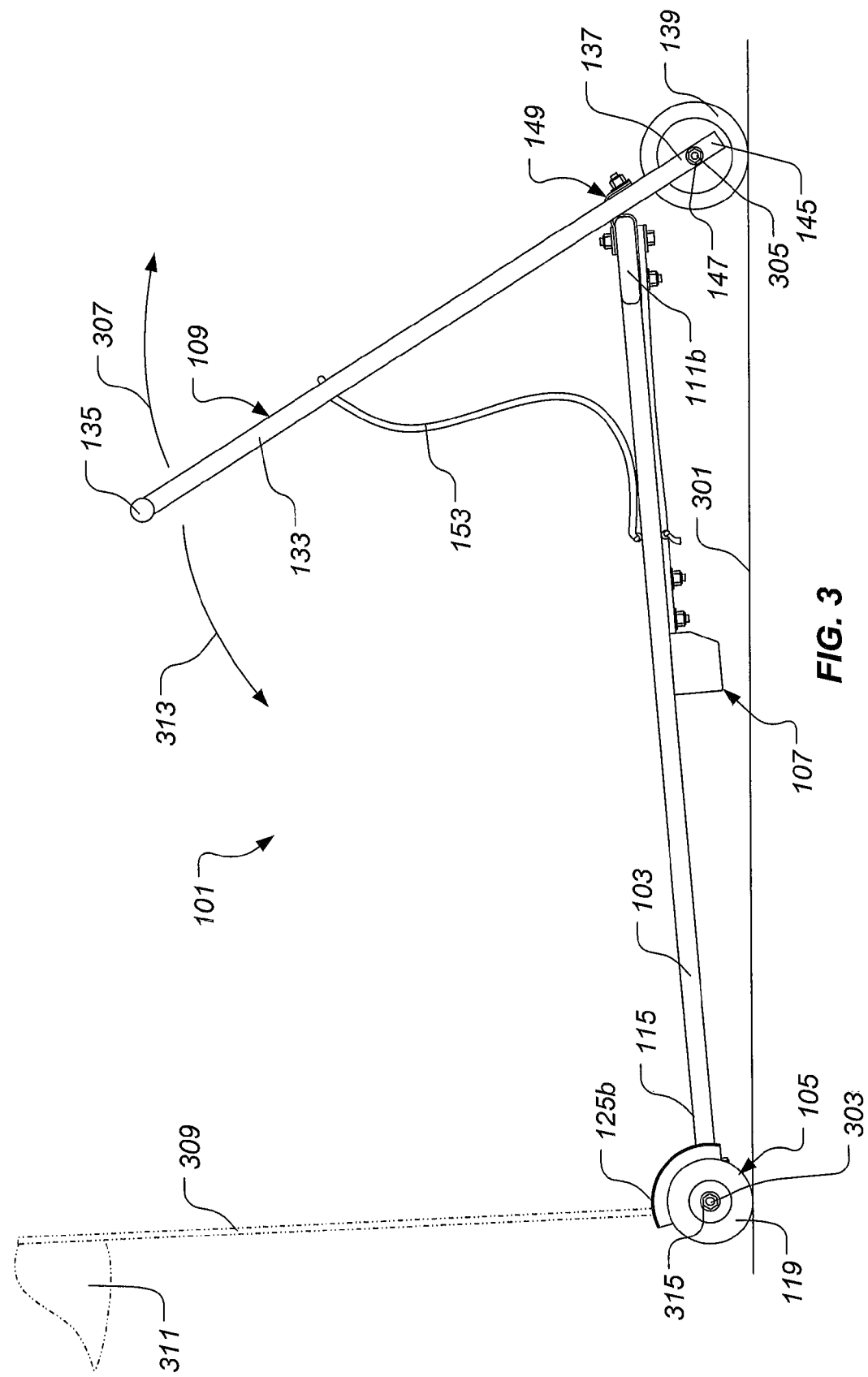
FIG. 3 is a side, elevational view of the vehicle of FIG. 1.
Figure 4:
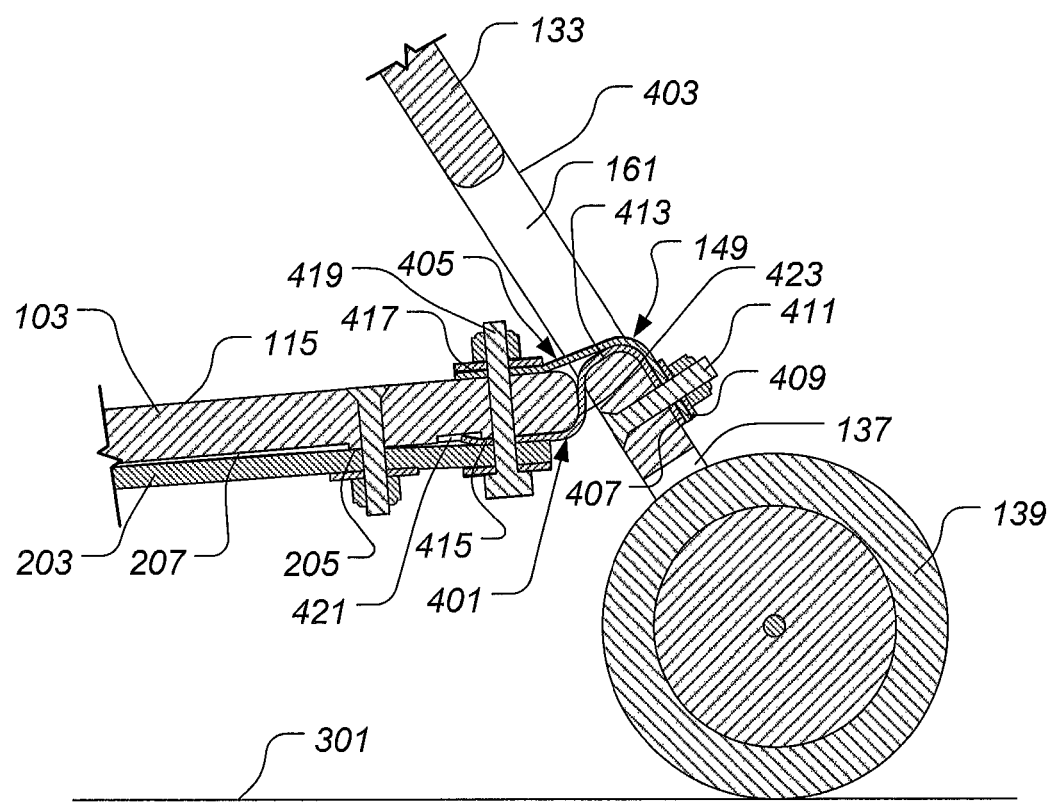
FIG. 4 is an enlarged, cross-sectional, side view of the vehicle of FIG. 1, taken along the line 4-4 in FIG. 1.
Figure 5:
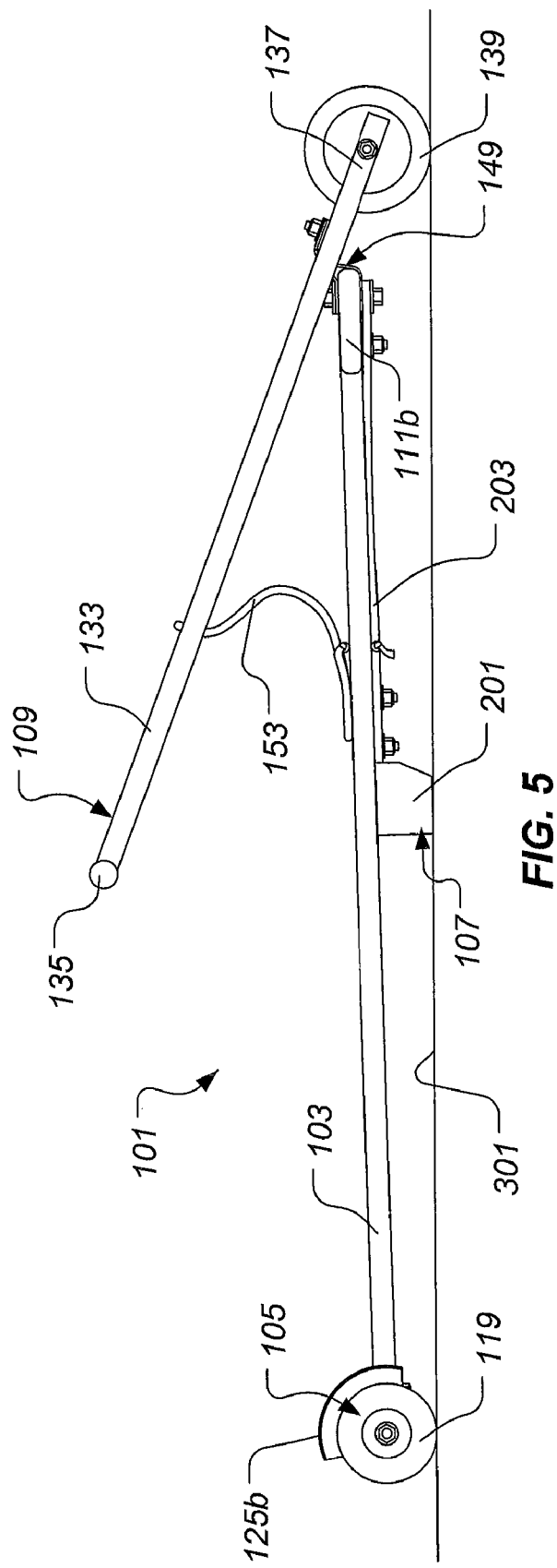
FIG. 5 is a side, elevational view of the vehicle of FIG. 1 illustrating the vehicle in a rider-sitting, braking mode, wherein a brake pad of the vehicle is in a substantially new state.
Figure 6:
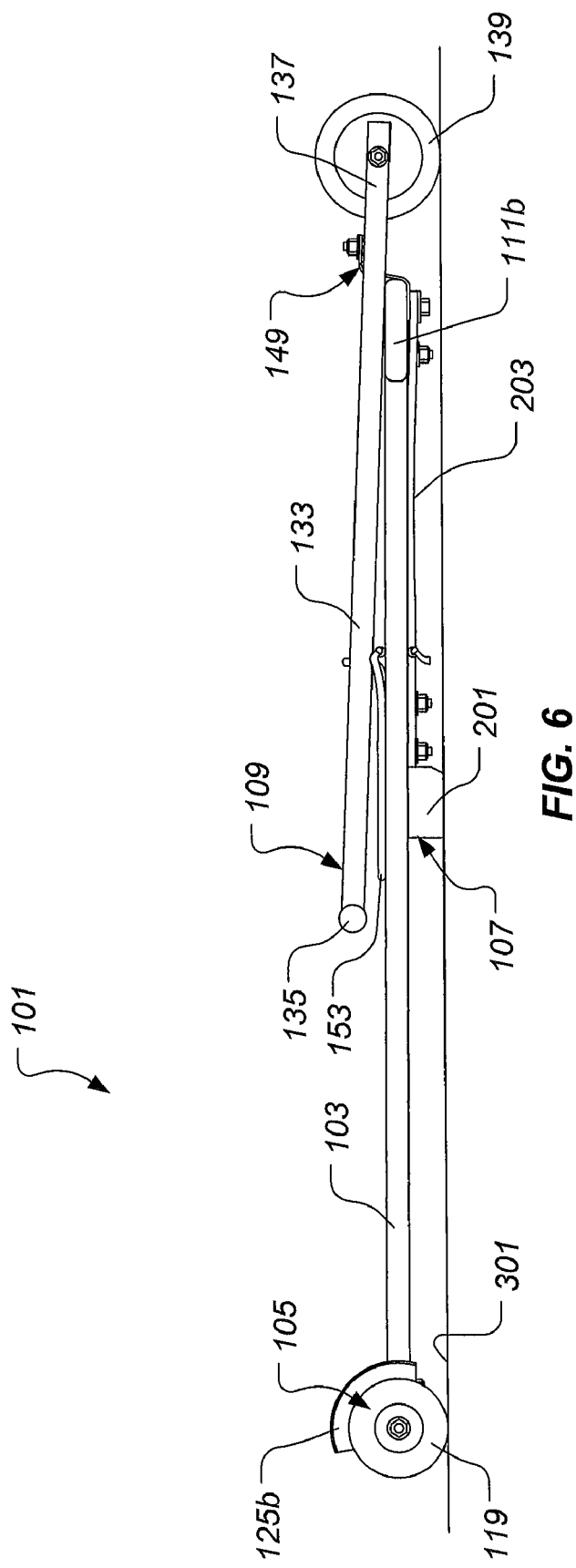
FIG. 6 is a side, elevational view of the vehicle of FIG. 1 illustrating the vehicle in a rider-sitting, braking mode, wherein the brake pad of the vehicle is in a worn state.
Figure 7:
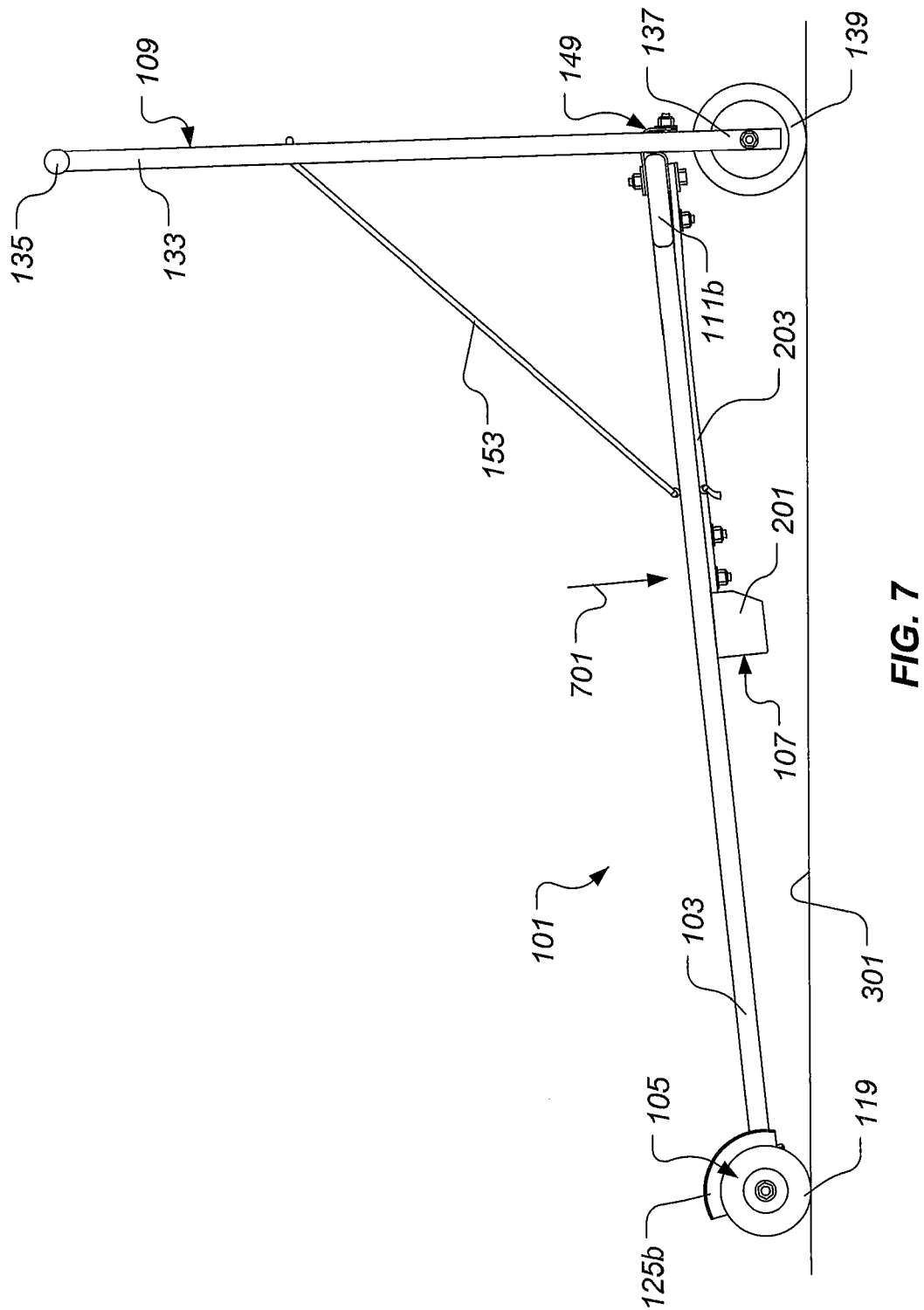
FIG. 7 is a side, elevational view of the vehicle of FIG. 1 illustrating the vehicle in a rider-standing, non-braking mode.
Figure 8:
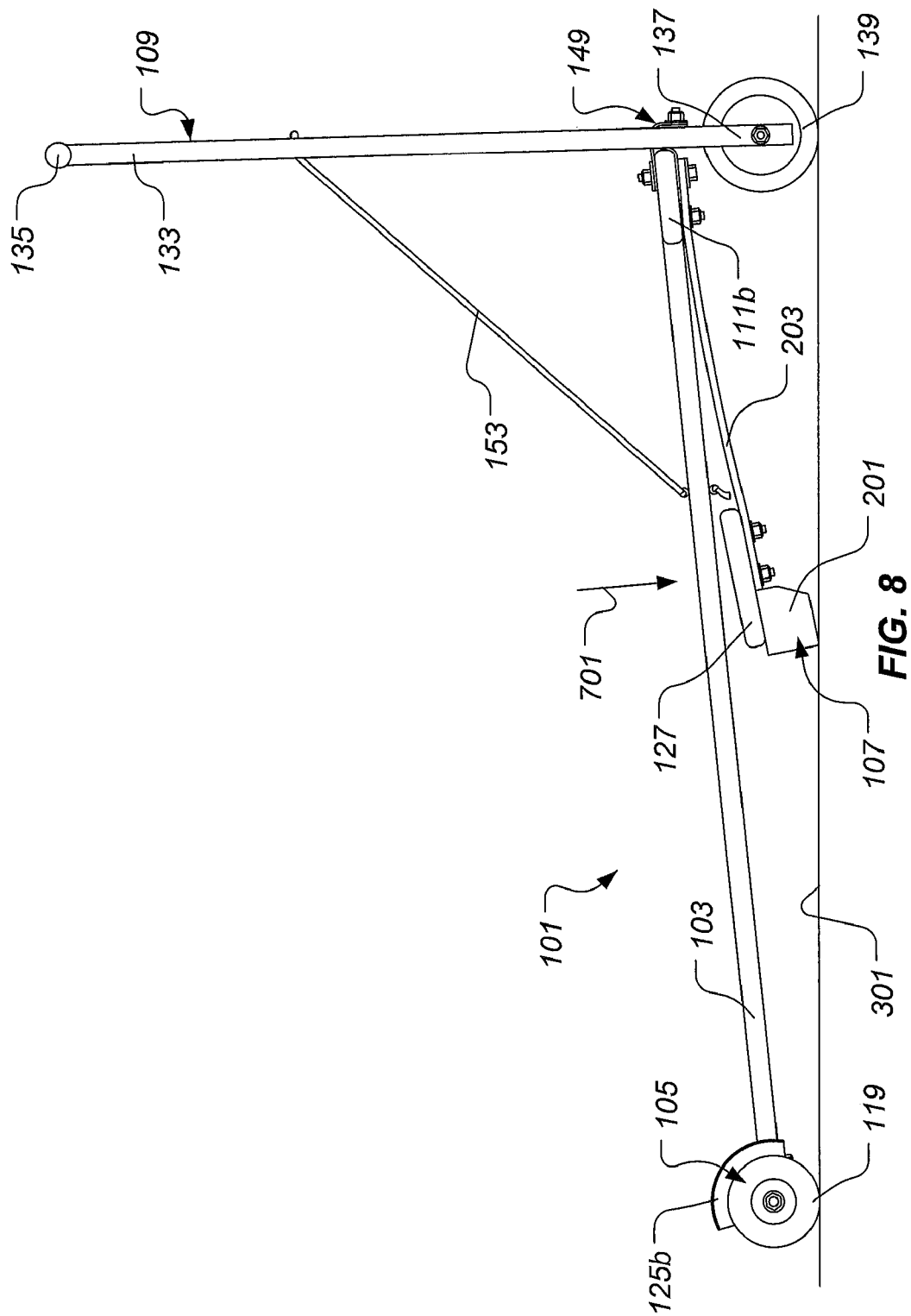
FIG. 8 is a side, elevational view of the vehicle of FIG. 1 illustrating the vehicle in a rider-standing, braking mode. wherein the brake pad of the vehicle is in a substantially new state.
Figure 9:
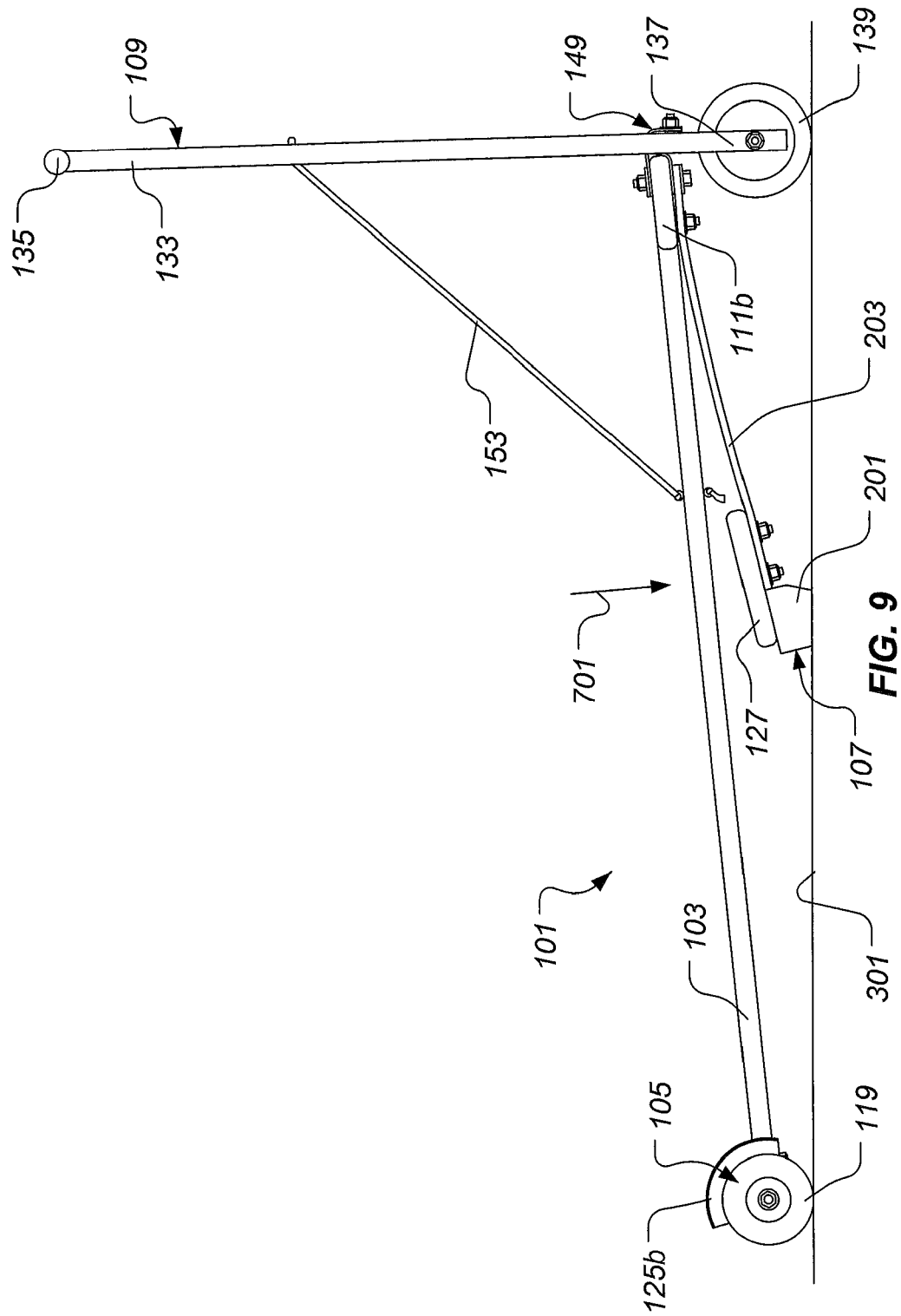
FIG. 9 is a side, elevational view of the vehicle of FIG. 1 illustrating the vehicle in a rider-standing, braking mode, wherein the brake pad of the vehicle is in a worn state.

FIGS. 1-13 depict an illustrative embodiment of a vehicle 101 in various modes of operation. Generally, vehicle 101 may be operated in a "rider-sitting" mode or in a "rider-standing" mode with no mechanical alteration to vehicle 101. Moreover, vehicle 101 may be operated in a "braking" mode or in a "non-braking" mode while either in the rider-sitting mode or in the rider-standing mode. FIGS. 1-3 depict top, bottom, and side views of vehicle 101 in a non-braked, rider-sitting mode. FIG. 4 depicts an enlarged, cross-sectional, side view of a portion of vehicle 101, as is described in greater detail herein. FIGS. 5 and 6 depict right side views of vehicle 101 in a braking, rider-sitting mode. FIG. 7 depicts a side view of vehicle 101 in a non-braked, rider-standing mode. FIGS. 8 and 9 depict side views of vehicle 101 in a braked, rider-standing mode.

Figure 10:
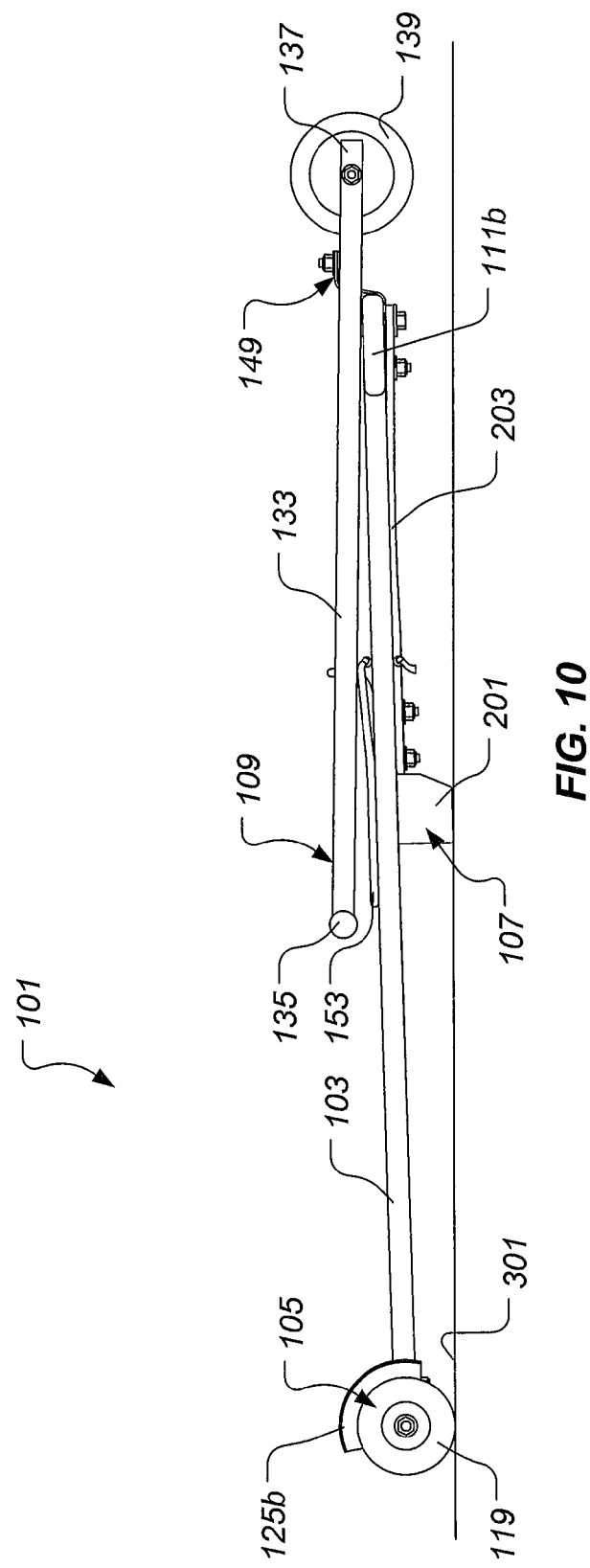
FIG. 10 is a side, elevational view of the vehicle of FIG. 1 illustrating the vehicle in an idle mode.

FIG. 10 depicts a side view of vehicle 101 in an idle mode, i.e., when a rider is not using vehicle 101. In the idle mode, vehicle 101 preferably operates only in the braking mode. Note that left side views of vehicle 101 are substantially mirror images of the corresponding right side views of vehicle 101.

Figure 11:
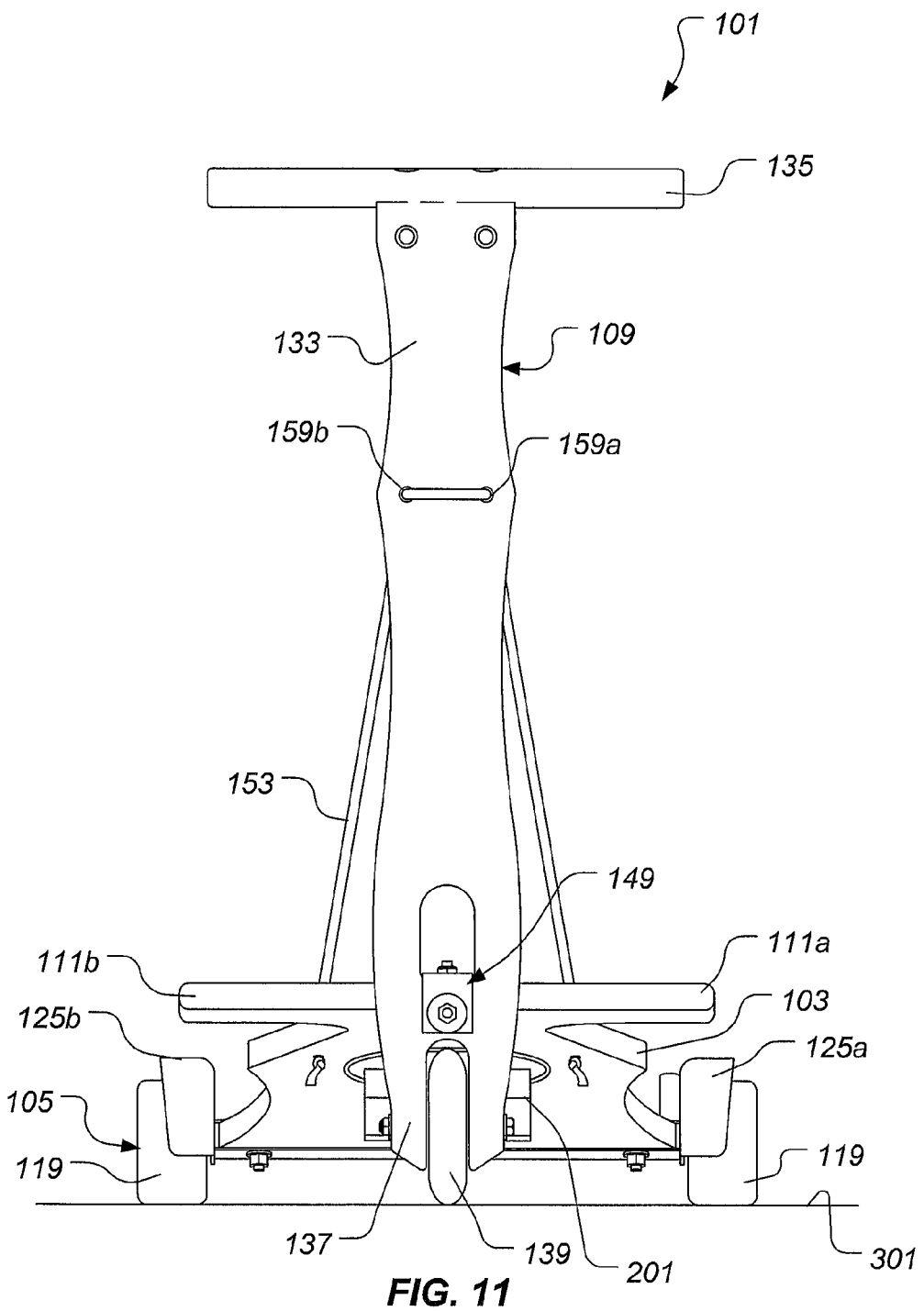
FIG. 11 is a front, elevational view of the vehicle of FIG. 1 illustrating the vehicle in a straight-traveling configuration.
Figure 12:
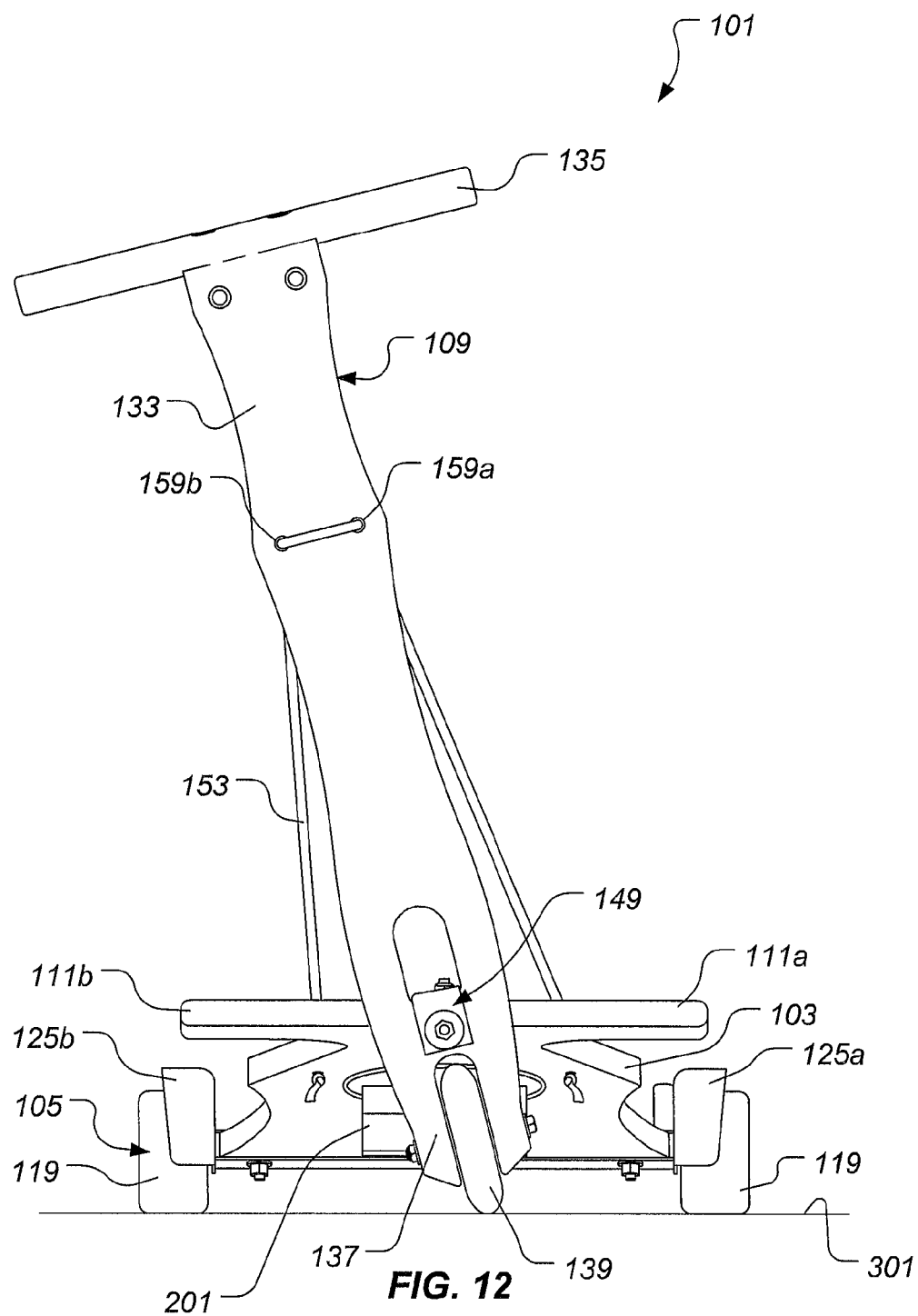
FIGS. 12 and 13 are front, elevational views of the vehicle of FIG. 1 illustrating the vehicle in turning configurations.
Figure 13:
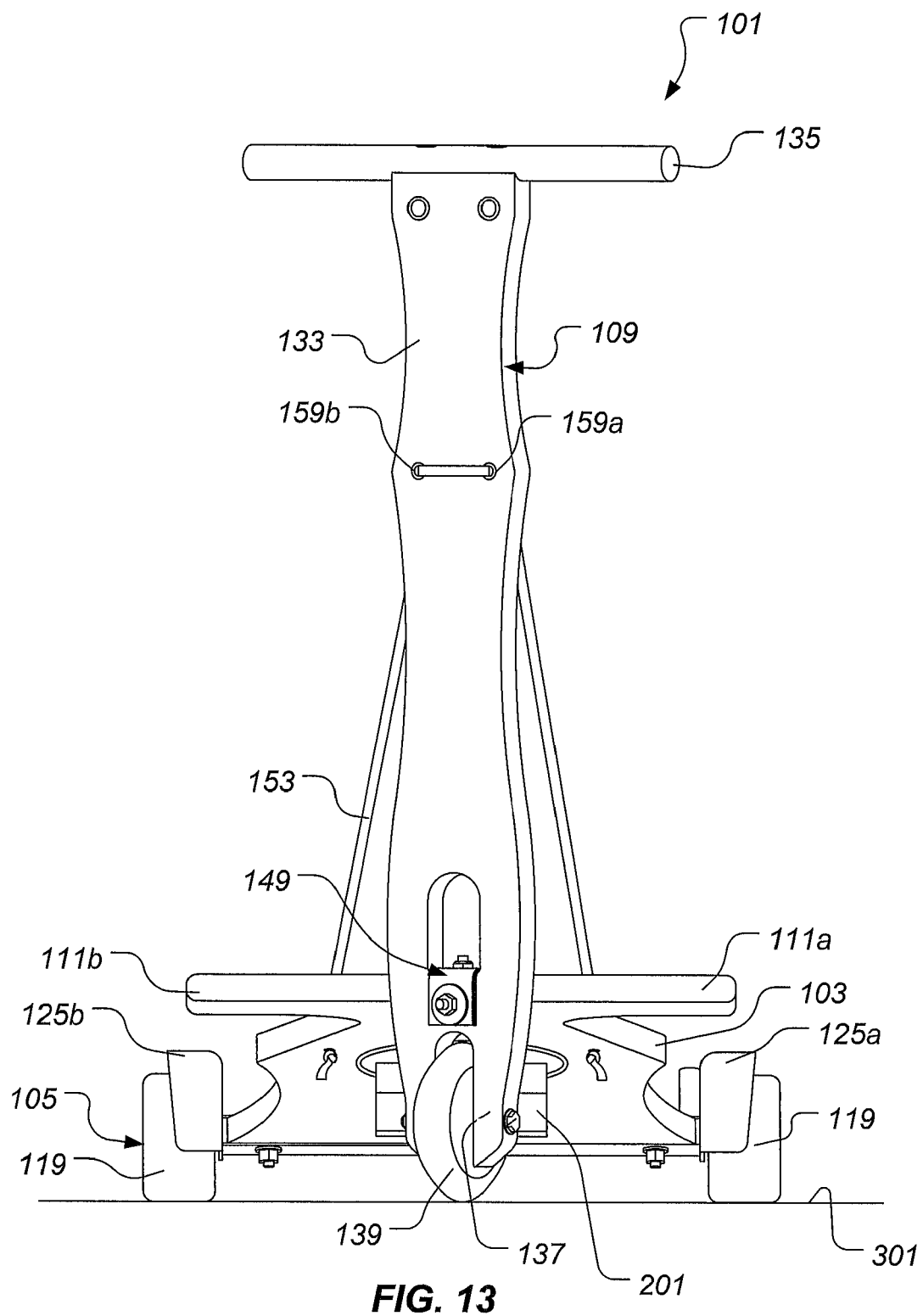

Vehicle 101 may travel generally along a straight path or along a curved path. In other words, vehicle 101 can be steered by a rider along generally straight or curved paths. FIG. 11 depicts a front view of vehicle 101 in a generally straight traveling mode. FIGS. 12 and 13 depict a front view of vehicle 101 in turning modes.

Referring particularly to FIGS. 1-3, the illustrated embodiment of vehicle 101 comprises a deck 103, an aft running gear 105, a brake assembly 107, and a steering assembly 109. A rider (not shown) operates or uses vehicle 101 preferably by either sitting on deck 103 or by standing on deck 103. When sitting on deck 103, the rider operates vehicle 101 in the rider-sitting mode, as discussed herein. When standing on deck 103, the rider operates vehicle 101 in the rider-standing mode, as discussed herein. It should be noted that when vehicle 101 is operated in the rider-standing mode, the rider can stand on deck 103 with either one foot or with two feet. For example, the rider can propel vehicle 101 by standing on deck 103 with one foot while engaging a surface, such as a surface 301 of FIG. 3, over which vehicle 101 travels with the other foot. Alternatively, the rider can stand on deck 103 with both feet if surface 301 over which vehicle 101 travels is sloped.

Still referring to FIGS. 1-3, the illustrated embodiment of deck 103 includes footrests 111a and 111b. During use in the rider-sitting mode, one or both of the rider's feet can be placed on footrests 111a and 111b. While footrests 111a and 111b are integral with deck 103 in the illustrated embodiment, the scope of the present invention is not so limited. Rather, one or both of footrests 111a and 111b may comprise separate elements that are attached or affixed, either permanently or removably, to deck 103.

Preferably, deck 103 comprises an engineered wood laminate, although the scope of the present invention is not so limited. Rather deck 103 may comprise any material suitable for supporting a rider while operating vehicle 101. For example, alternative embodiments of deck may comprise an engineered wood material other than an engineered wood laminate, a metallic material, a metallic-matrix or polymeric-matrix composite material, or the like. Moreover, vehicle 101 may comprise one or more structural elements attached to, embedded in, or otherwise operably associated with deck 103 to provide mechanical or structural properties to vehicle 101 beyond the mechanical and structural properties provided by deck 103. It should be noted the front of deck 103 incorporates a fulcrum 213, as shown in FIG. 2. Mechanical loads applied to wheel 139 are transmitted through steering assembly 109 and fulcrum 213 into deck 103. Fulcrum 213 also allows steering assembly 109 to pivot relative to deck 103 while vehicle 101 is operated in the rider-sitting, braking mode. Moreover, fulcrum 213 limits the travel of steering assembly 109 during steering operations, e.g., as shown in FIGS. 12 and 13.

In the illustrated embodiment, vehicle 101 further comprises one or more anti-slip or skid-resistant portions 113a and 113b attached to an upper surface 115 of deck 103 and an anti-slip or skid-resistant portion 123 attached to the top surface of brake pedal 127. It should be noted that the particular configuration, size, and locations of skid-resistant portions 113a, 113b and 123 are merely exemplary. Moreover, skid resistant portions, such as skid-resistant portions 113a, 113b and 123, may be omitted in some embodiments.

Still referring to FIGS. 1-3, aft running gear 105 is attached to an aft end 117 of deck 103. In the illustrated embodiment, aft running gear 105 comprises a plurality of wheels 119 operably associated with an axle 303 (see FIG. 3). Wheels 119 are free to rotate with respect to axle 303 and are retained on axle 303 by nuts 315. Preferably, wheels 119 are interfaced with axle 303 by friction-reducing elements, such as bushings or bearings. Moreover, wheels 119 preferably include elastomeric or polymeric portions at locations where wheels 119 contact surface 301 over which vehicle 101 travels. Preferably, as shown in FIGS. 1-3, fenders 125a and 125b partially shroud wheels 119.

Brake assembly 107 comprises a brake pad 201 operably associated with a brake pedal 127 that is attached in a cantilever fashion to deck 103 by a biasing element 203. Brake pad 201 may comprise any suitable material, such as an elastomeric material, natural rubber, synthetic rubber, or the like. Deck 103 defines an opening 129 into which brake pedal 127 is received. Biasing element 203 biases brake pedal 127 into opening 129 and biases brake pad 201 away from surface 301 over which vehicle 101 travels. Biasing element 203 may take on forms other than the form depicted in the accompanying drawings, such as a helical coil or the like. Biasing element 203 may comprise any suitable material, such as a fiber-reinforced, polymeric material, e.g., fiberglass; a polymeric material without fiber-reinforcement; a metallic material, e.g., steel; or the like. Preferably, brake pedal 127 does not extend above an upper surface 115 of deck 103. Accordingly, referring in particular to FIG. 2, brake pad 201 is attached to brake pedal 127 such that brake pad 201 extends over brake pedal 127 and a lower surface 205 of deck 103. Thus, when brake assembly 107 is not operated by brake pedal 127, brake pad 201 abuts lower surface 205 of deck 103 to limit upward movement of brake pedal 127 in opening 129 of deck 103. The upward movement of the forward portion of brake pedal 127 is limited by the aft portion of biasing element 203. Moreover, it is preferable, but not required, for lower surface 205 of deck 103 to define a groove 207 into which biasing element 203 is received when brake assembly 107 is not operated by brake pedal 127.

Returning now to FIGS. 1-3, steering assembly 109 comprises a steering arm 133 having a handle 135 at a first end and a yoke 137 at second end. Steering arm 133 may comprise any suitable material, such as an engineered wood laminate, an engineered wood material other than an engineered wood laminate, a metallic material, a metallic-matrix or polymeric-matrix composite material, or the like. Steering arm 133 is adjustable in length in some embodiments. When operating vehicle 101, a rider grasps handle 135 with at least one hand but preferably with two hands. In the illustrated embodiment, handle 135 comprises a separate element that is assembled into steering arm 133. In alternative embodiments, however, handle 135 forms an integral portion of steering arm 133. Handle 135 may comprise a plurality of separate elements that are attached or affixed, either permanently or removably, to steering arm 133. Steering assembly 109 further includes a wheel 139 disposed at an open end 141 of yoke 137 and operably associated with an axle 305. Preferably, wheel 139 is interfaced with axle 305 by friction-reducing elements, such as bushings or bearings. Moreover, wheel 139 preferably includes elastomeric or polymeric portions at locations where wheel 139 contacts surface 301 over which vehicle 101 travels. In the illustrated embodiment, axle 305 extends through yoke 137 and wheel 139 is disposed between arms 143 and 145 of yoke 137. Axle 305 is retained on yoke 137 by nuts 147. Steering assembly 109 is flexibly attached to deck 103 by flexible joint 149 proximate a closed end 151 of yoke 137, which is described in greater detail herein with regard to FIG. 4.

Steering assembly 109 is pivotable with respect to deck 103, about fulcrum 213 (shown in FIG. 2), between the rider-standing mode, as shown in FIGS. 6-8 and 11-13; the rider-sitting, non-braking mode, as shown in FIGS. 1-3; the rider-sitting, braking mode, as shown in FIG. 5; and the idle mode, shown in FIGS. 9 and 10. It should be noted that steering assembly 109 is used both in the rider-standing mode and the rider-sitting mode. Forward pivot, that is, in the direction of arrow 307 of FIG. 3, of steering assembly 109, however, is limited by a restraint 153. Thus, if wheel 139 receives an impact during use of vehicle 101, such as, for example, a rock or the like, at least some of the impact forces are resolved through restraint 153, thus reducing the impact forces experienced by the rider. Moreover, restraint 153 limits rider-induced forward pivoting of steering assembly 109. Restraint 153 extends between steering arm 133 and deck 103 but terminates at deck 103. In the illustrated embodiment, restraint 153 comprises a rope material. While restraint 153 is depicted as being a single, continuous portion, restraint may comprise multiple, joined segments. Preferably, restraint 153 comprises a polymeric rope material that allows a limited amount of stretching to absorb impact forces without permanent deformation, thus reducing peak forces generated at axle 305 during impact to wheel 139. In the illustrated embodiment, restraint 153 extends through openings 159a and 159b, best shown in FIGS. 11-13, defined by steering arm 133, and openings 155a and 155b defined by deck 103. Knots 121a, 121b, 209a, and 209b are formed at ends of restraint 153 to retain restraint 153 in place, extending through steering arm 133 and deck 103. It should be noted that restraint 153 can comprise materials other than rope materials, such as metallic cable material, polymeric-coated, metallic cable material, polymeric cable material, metallic chain, polymeric chain, or the like. Furthermore, restraint 153 may include features other than knots 121a, 121b, 209a, and 209b or employ other elements to retain restraint 153 in operable association with steering arm 133 and deck 103. Openings 155a and 155b are preferably sized and configured to keep knots 121a, 121b, 209a, and 209b tight and to inhibit chafing of restraint 153.

Referring to FIG. 1, the illustrated embodiment of vehicle 101 includes a fitting 157 adapted to receive and retain a flag mast 309, to which a safety flag 311 is attached. Flag mast 309 and flag 311 are shown in phantom in FIG. 3. In one embodiment, vehicle 101 comprises fitting 157, flag mast 309, and flag 311. In an alternative embodiment, vehicle 101 comprises fitting 157 but omits flag mast 309 and flag 311.

Turning now to FIG. 4, flexible joint 149 joining deck 103 and steering arm 133 extends between deck 103 and steering arm 133 through an opening 161 defined by steering arm 133. In the illustrated embodiment, flexible joint 149 comprises a first flexible member 401 extending between an upper surface 403 of steering arm 133 and lower surface 205 of deck 103, through opening 161 of steering arm 133. Flexible joint 149 further includes a second flexible member 405 extending between a first end 407 of first flexible member 401 and upper surface 115 of deck 103. Preferably, flexible members 401 and 405 comprise belting material and, more preferably, flexible members 401 and 405 comprise belting material that is resistant to stretching. In an alternate embodiment first flexible member 401 and second flexible member 405 may be made as one part, joined at first end 407 and first end 409, respectively First end 407 of first flexible member 401 is attached to upper surface 403 of steering arm 133 and a first end 409 of second flexible member 405 is attached to first flexible member 401 by a fastener 411 that extends through first flexible member 401, second flexible member 405 and steering arm 133. First flexible member 401 extends across an inner surface 413 of steering arm 133 that defines opening 161 in steering arm 133, extends across outer surface 423, and terminates at lower surface 205 of deck 103. Second flexible member 405 extends across first flexible member 401 and terminates at upper surface 115 of deck 103. A second end 415 of flexible member 401 and a second end 417 of flexible member 405 are attached to deck 103 by a fastener 419 that extends through first flexible member 401, deck 103, and second flexible member 405. It should be noted that, in the illustrated embodiment fastener 419 also fastens biasing element 203 to deck 103 and that second end 415 of first flexible member 401 is captured between lower surface 205 of deck 103 and biasing element 203. Thus, first flexible member 401 serves to preload biasing element 203, so that brake pedal 127 is fully retracted into opening 129 of deck 103, as shown in FIG. 3. Other means for preloading biasing element 203, however, are encompassed within the scope of the present invention, such as forming biasing element 203 to provide the preload. In the illustrated embodiment, lower surface 205 of deck 103 defines a slot 421 for receiving a portion of second end 415 of second flexible member 401.

In the illustrated configuration of FIG. 4, wherein first flexible member 401 extends across inner surface 413, i.e., a "friction surface," of steering arm 133 and second flexible member 405 extends across first flexible member 401 generally at inner surface 413, provides an alternate load path for forces transmitted through first flexible member 401 and second flexible member 405 to reduce shear loading at fastener 411. First flexible member 401 extends across an outer surface 423, which is also a "friction surface," of deck 103 to provide an alternate load path for forces transmitted through first flexible member 401 to reduce shear loading at fastener 419. It should be noted that inner surface 413 and/or outer surface 423 may include a friction-increasing surface finish or coating. Moreover, the illustrated configuration, wherein two separate flexible members, i.e., flexible members 401 and 405, are used in flexible joint 149, provides redundancy in the event that one of flexible members 401 and 405 mechanically fails. Moreover, the compliant nature of flexible joint 149 provides shock absorbing capabilities to vehicle 101 while limiting motion of steering assembly 109 with respect to deck 103.

It should be noted that flexible members 401 and 405, as well as restraint 153 (shown in at least FIG. 1), may comprise laminated members comprising a plurality of layers, such as structural layers, protective layers, and the like, or be made from multiple linked segments. Flexible members 401 and 403, as well as restraint 153, may be attached to other elements or members of vehicle 101 by means other than those described herein and depicted in the attached drawings.

It should also be noted that the scope of the present invention is not limited to the attachment locations of flexible joint 149 and restraint 153 to steering arm 133 and deck 103 shown in the accompanying drawings. Rather, other attachment locations are contemplated by the present invention.

Moreover, in at least one embodiment, the particular configuration of flexible joint 149 may be replaced by one or more hinged joints, slides, ball joints, or the like.

Various exemplary modes of operation of vehicle 101 are now explained with reference to the accompanying drawings. It should be noted that vehicle 101 requires no modifications to be operated in any of the several operating modes. FIG. 3 depicts vehicle in the rider-sitting, non-braking mode. In the rider-sitting, non-braking mode, a rider sits on upper surface 115 of deck 103 and operates vehicle 101 to coast from a higher elevation to a lower elevation along surface 301 over which vehicle 101 travels. Preferably, the rider's feet are placed on foot rests 113a and 113b. It should be noted that brake pad 201 is spaced away from surface 301 over which vehicle 101 travels when vehicle 101 is in the rider-sitting, non-braking mode.

To decrease a velocity of vehicle 101, including bringing vehicle 101 to a stop, the rider lowers handle 135 of steering assembly 109, i.e., pivots steering arm 133 about fulcrum 213, in a direction generally corresponding to an arrow 313. By so lowering handle 135, the rider places vehicle 101 in the rider-sitting, braking mode, shown in FIGS. 5 and 6, such that brake pad 201 frictionally engages surface 301 over which vehicle 101 travels. It should be noted that, in FIG. 5, brake pad 201 is depicted in a substantially new condition, while in FIG. 6 brake pad 201 is depicted in a worn condition. The mechanical interaction between brake pad 201 and surface 301 reduces the velocity of vehicle 101. It should be noted that the rider can raise handle 135 to disengage brake pad 201 from surface 301 and/or lower handle 135 to engage brake pad 201 with surface 301 at will to regulate the velocity vehicle 101. The brake force generated at surface 301 by brake pad 201 is proportional to the position of handle 135 above deck 103. Moving handle 135 in the direction generally corresponding to an arrow 313 will increase the braking force while moving handle 135 in the general direction to an arrow 307 will reduce the braking force and continued movement in the general direction corresponding to an arrow 307 will disengage the brake.

FIG. 7 depicts vehicle 101 in a rider-standing, non-braking mode. In the rider-standing, non-braking mode, a rider stands on upper surface 115 of deck 103 and operates vehicle 101. In a coasting mode of operation, the rider operates vehicle 101 to coast from a higher elevation to a lower elevation along surface 301 over which vehicle 101 travels. In a propelled mode of operation, the rider places one foot on upper surface 115 of deck 103 and engages surface 301 over which vehicle travels with the other foot to propel vehicle 101. It should be noted that brake pad 201 is spaced away from surface 301 over which vehicle 101 travels when vehicle 101 is in the rider-standing, non-braking mode.

To decrease a velocity of vehicle 101, including bringing vehicle 101 to a stop, the rider urges brake pedal 127 downward, generally in a direction corresponding to an arrow 701. By so urging brake pedal 127 downward, the rider places vehicle 101 in the rider-standing, braking mode, shown in FIGS. 8 and 9, such that brake pad 201 frictionally engages surface 301 over which vehicle 101 travels. FIG. 8 depicts vehicle 101 including a substantially new or unworn brake pad 201, while FIG. 9 depicts vehicle 101 including a worn brake pad 201 that has been sufficiently worn so that brake pad 201 should be replaced. The mechanical interaction between brake pad 201 and surface 301 reduces the velocity of vehicle 101. It should be noted that the rider can release brake pedal 127, i.e., allow biasing element 203 to overcome the rider's downward force on brake pedal 127, to disengage brake pad 201 from surface 301. Rider can engage and/or disengage brake pad 201 with surface 301 at will to regulate the velocity vehicle 101. The brake force generated at surface 301 by brake pad 201 is proportional to the rider's weight applied to brake pedal 127. An increase in the rider's weight applied to brake pedal 127 will increase the braking force while removing a portion of the rider's weight will decrease the braking force.

It should be noted that brake assembly 107 is used to decrease the velocity of vehicle 101 whether vehicle 101 is operated in the rider-standing mode or the rider-sitting mode, even though brake assembly 107 is placed into operation by different means depending upon whether vehicle 101 is being operated in the rider-standing mode or the rider-sitting mode.

In a preferred embodiment, brake pad 201 is located as far aft of wheel 139 as practical but forward of a location on deck 103 corresponding to a rider's torso when the rider is sitting on deck 103. In other words, brake pad 201 is preferably forward of the rider's torso to provide stability while in the rider-sitting mode, whether braking or non-braking, but as far aft along deck 103 as practical to increase the normal force applied to brake pad 201 when engaged by lowering steering assembly 109.

Referring to FIG. 2, brake pad 201 preferably defines a wear indication groove 211. At least a portion of wear indication groove 211 disappears when brake pad 201 is worn by use to a state wherein brake pad 201 should be replaced, such as shown in FIGS. 6 and 9.

FIG. 10 depicts vehicle 101 in the idle mode. When in the idle mode, brake pad 201 of vehicle 101 engages surface 301 over which vehicle 101 travels when vehicle is operated in the rider-sitting or rider standing modes. Thus, vehicle 101 is inhibited from traveling over surface 301 when in the idle mode, as brake pad 201 is frictionally engaged with surface 301. It should be noted that vehicle 101 is depicted having a substantially new brake pad 201 in FIG. 10. Thus, when vehicle 101 is left in the idle mode, brake pad 201 inhibits vehicle 101 from inadvertently traveling along surface 301.

Brake assembly 107 provides significant safety benefits to vehicle 101. As discussed herein, brake pad 201 engages surface 301 over which vehicle can travel if no rider is operating vehicle 101. Moreover, brake pad 201 engages surface 301 if a rider leaves vehicle 101 while vehicle 101 is in motion, as steering assembly 109, i.e. steering arm 133, rotates about fulcrum 213 toward deck 103 generally in the direction of arrow 313 of FIG. 3. Furthermore, brake pad 201 engages surface 301 if a rider releases handle 135 of steering assembly 109, as steering arm 133 rotates about fulcrum 213 toward deck 103 generally in the direction of arrow 313 of FIG. 3. Brake pad 201 also engages surface 301 in the unlikely event that flexible joint 149 fails.

Moreover, brake assembly 107 provides an independent load reaction path for braking forces to be resolved, which inhibits feedback forces to brake actuation mechanisms, i.e., steering assembly 109 and/or brake pedal 127.

FIG. 11 depicts vehicle in a configuration for substantially straight line motion. FIGS. 12 and 13 depict two different modes of operation to turn vehicle 101, i.e., to operate vehicle 101 along a non-linear path over surface 301. It should be noted that, while FIGS. 11-13 depict vehicle 101 in the rider-standing, non-braking mode, the turning modes depicted in FIGS. 12 and 13 are equally useful in the rider-sitting, non-braking mode. Moreover the two different turning modes will function while vehicle 101 is operated in rider-sitting, brake mode and rider-standing, brake mode. In one mode, a rider can cause vehicle 101 to turn along a non-linear path by tilting steering assembly 109 about flexible joint 149 to the rider's right, i.e., to starboard, as shown in FIG. 12, or to the rider's left, i.e., to port, opposite to that shown in FIG. 12. Tiling steering assembly 109 to the rider's right causes vehicle 101 to turn right, while tiling steering assembly 109 to the rider's left causes vehicle 101 to turn left. The rider can regulate the amount or degree of turn by controlling the amount steering assembly 109 is tilted. Tilting steering assembly 109 by a greater amount results in a greater amount of turn. Tilting steering assembly 109 by a lesser amount results in a lesser amount of turn.

Alternatively or in combination with the turning mode shown in FIG. 12, a rider can cause vehicle 101 to turn along a non-linear path by rotating steering assembly 109 clockwise about fulcrum 213, as shown in FIG. 13, or by rotating steering assembly 109 counter clockwise, opposite to that shown in FIG. 13. Rotating steering assembly 109 clockwise causes vehicle 101 to turn right, while rotating steering assembly 109 counterclockwise causes vehicle 101 to turn left. The rider can regulate the amount or degree of turn by controlling the amount steering assembly 109 is rotated. Greater rotation of steering assembly 109 results in a greater amount of turn, while lesser rotation of steering assembly 109 results in a lesser amount of turn.

It should be noted that the wheels, e.g., wheels 119 and 139, of vehicle 101 may be replaced, in some embodiments, with other elements, such as rollers, treaded wheels, tracks, multiple rollers or wheels, skis, blades, low friction pads, and the like. Moreover, wheels, e.g., wheels 119 and 139, of vehicle 101 may have different or similar sizes, such as diameters.

It should also be noted that, while the fasteners illustrated in the accompanying drawings include bolts or machine screws and nuts, the scope of the present invention encompasses other types of fasteners, such as rivets, staples, clamps, eyebolts, and the like. Moreover, while a particular number of fasteners are depicted as joining, attaching or coupling various members or elements of vehicle 101, the scope of the present invention encompasses other quantities of fasteners to accomplish the joining, attaching, or coupling of the various members.

The present invention provides significant advantages, including, but not limited to: (1) providing a vehicle that can be operated in a rider-standing mode or a rider-sitting mode without structurally altering the vehicle; (2) providing a vehicle that utilizes a single braking assembly whether the vehicle is operated in a rider-standing mode or a rider-sitting mode; and (3) providing a vehicle having a braking means that is actuated using different methods depending upon whether the vehicle is being operated in a rider-standing mode or a rider-sitting mode.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A vehicle, comprising:
   a rigid deck;
   an aft running gear attached to the deck;
   a steering assembly;
   a flexible joint attaching the steering assembly to the deck, such that the steering assembly is pivotable about the flexible joint with respect to the deck between a rider-standing mode and a rider-sitting mode; and
   a brake assembly attached to the deck, the brake assembly having:
      a brake pedal;
      a biasing element coupling the brake pedal and the deck; and
      a brake pad operably associated with the brake pedal;
   wherein the brake pad gradually moves towards a surface over which the vehicle is traveling as the steering assembly pivotally transitions from the rider-standing mode through the rider-sitting mode to the deck;
   wherein the brake pad is in braking contact with the surface during non-operational use of the vehicle;
   wherein the steering assembly is tiltable about the flexible joint with respect to the deck to turn the vehicle; and
   wherein the steering assembly includes a steering arm defining an opening and a first flexible member and a second flexible member extend through the opening.

2. The vehicle, according to claim 1, further comprising:
   an opening extending from an upper surface of the deck to a lower surface of the deck, the opening being adapted to receive a portion of the brake pedal.

3. The vehicle, according to claim 1, further comprising:
   a wear indication groove operably associated with brake pad;
   wherein the wear indication groove is adapted to disappear as the brake pad is worn by use to a state where the brake pad should be replaced.

4. The vehicle, according to claim 1, wherein the steering assembly is pivotable about the flexible joint with respect to the deck to engage the brake assembly with a surface over which the vehicle is traveling.

5. The vehicle, according to claim 1, wherein the deck comprises:
   at least one footrest.

6. The vehicle, according to claim 1, wherein the steering assembly comprises:
   a handle at a first end of the steering arm;
   a yoke at a second end of the steering arm; and
   a wheel operably associated with the yoke.

7. The vehicle, according to claim 1, wherein the steering assembly is rotatable about the steering arm with respect to the deck to turn the vehicle.

8. The vehicle, according to claim 1, wherein the flexible joint comprises:
   a first end of the first flexible member attached at the steering assembly and a second end of the first flexible member attached at a lower surface of the deck; and a first end of the second flexible member attached at the steering assembly and a second end of the second flexible member attached at an upper surface of the deck.

9. The vehicle, according to claim 1, wherein the steering arm includes a friction surface defining a portion of the opening, such that the first flexible member extends across the friction surface of the steering arm.

10. The vehicle, according to claim 1, wherein the deck includes a friction surface, such that the first flexible member extends across the friction surface of the deck.

11. The vehicle, according to claim 1, wherein the deck comprises:
a fulcrum about which the steering assembly pivots.

12. The vehicle, according to claim 1, further comprising:
a restraint extending between the steering assembly and the deck to limit a forward rotation of the steering assembly.

* * * * *